Sept. 2, 1952    A. W. C. TAYLOR ET AL    2,609,337
DISTILLATION OF LIQUID MIXTURES CONTAINING ALDEHYDES AND COBALT
Filed Sept. 9, 1948
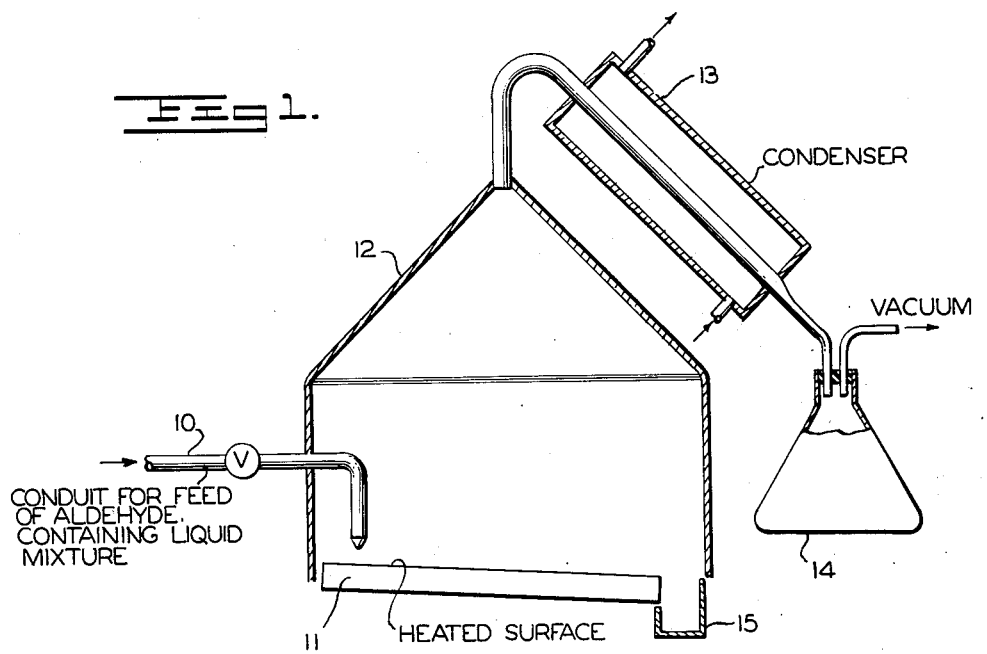
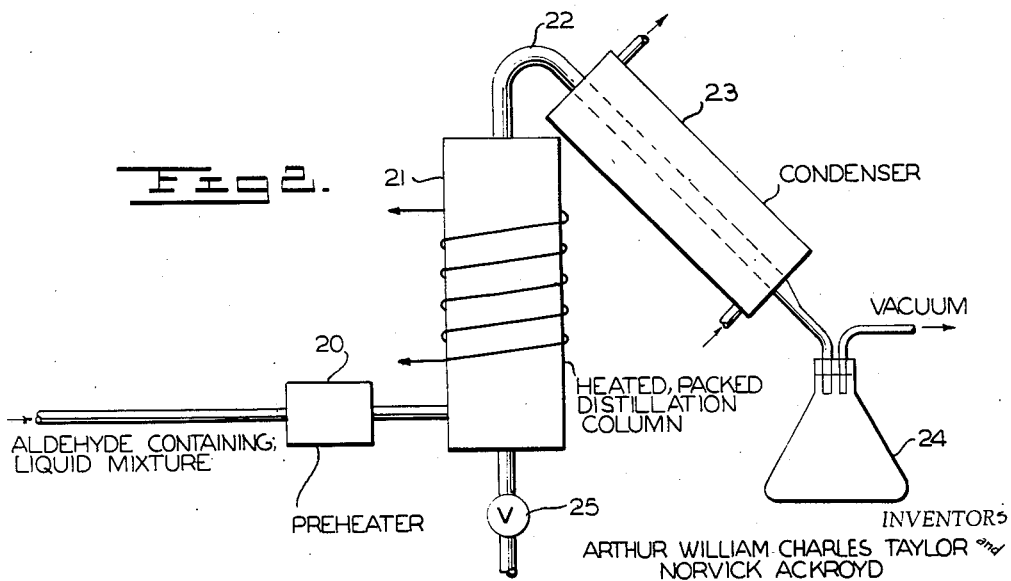
INVENTORS
ARTHUR WILLIAM CHARLES TAYLOR and
NORVICK ACKROYD
BY Cushman, Darby & Cushman
ATTORNEYS Patented Sept. 2, 1952

2,609,337

UNITED STATES PATENT OFFICE 2,609,337

DISTILLATION OF LIQUID MIXTURES CONTAINING ALDEHYDES AND COBALT

Arthur William Charles Taylor and Norvik Ackroyd, Norton-on-Tees, England, assignors to Imperial Chemical Industries Limited, a corporation of Great Britain Application September 9, 1948, Serial No. 48,536
In Great Britain September 12, 1947

7 Claims. (Cl. 202—53)

This invention relates to the treatment of liquid mixtures containing aldehydes.

Such mixtures may be obtained, for example, by reacting olefines with carbon monoxide and hydrogen at elevated temperature and pressure in the presence of a catalyst which may comprise a metal or a compound thereof. It is usual to recover the aldehydes from mixtures by a conventional distillation process. However, during the recovery of aldehydes by distillation from mixtures containing them together with metals and/or metallic compounds there is a tendency for loss of desired aldehydes to occur by condensation and/or polymerisation thereof to material having a high boiling point. An example of such a mixture is that obtained by reacting an olefine with carbon monoxide and hydrogen in the presence of a catalyst comprising metallic cobalt to produce an aldehyde. In such a process the reaction product tends to be contaminated with compounds of cobalt. When, for example, di-isobutylene is used, the mixture contains a nonaldehyde.

Our investigations have shown that the tendency for losses of aldehyde to occur during distillation is largely due to prolonged exposure of the mixture to elevated temperature while in contact with a metal such as cobalt, or with a metallic compound such as a compound of cobalt, for example, cobalt nonoate. These metals and/or metallic compounds appear to catalyse the above-mentioned condensation and/or polymerisation.

We have now found that such loss of aldehyde can be decreased and even substantially avoided if the aldehyde containing mixture, which also contains a metal and/or metal compound, is subjected to a flush distillation in which the aldehyde is recovered in an overhead fraction.

By "flash distillation" in this specification is meant a process of distillation in which the liquid to be treated is subjected to such conditions of temperature and/or pressure for such time intervals that the desired product or products is or are rapidly vaporised, but without polymerisation and condensation, and are then cooled to obtain the aldehyde as a liquid.

The process may be conducted, for example (1) by supplying heat to the liquid at a high rate per unit volume of liquid, in which case the liquid is preferably in the form of a film; or (2) by submitting a warm liquid to pressure less than atmospheric; or (3) by a combination of methods (1) and (2); or by letting down a hot liquid which is under pressure to a lower pressure.

An understanding of the invention will be facilitated by reference to the accompanying drawing, the two figures of which illustrate apparatus suitable for carrying out the process.

Figure 1 illustrates diagrammatically simplified equipment for conducting the flash distillation by heating a thin film of liquid.

Figure 2 illustrates diagrammatically simplified equipment for conducting the flash distillation by feeding the liquid mixture to a heated, packed distillation column.

Referring to Figure 1, the aldehyde-containing liquid mixture is fed through a conduit 10 and permited to drip onto heated surface 11. The aldehyde vapors so produced are conducted away from the heated surface through hood 12, condensed in condenser 13 and collected in receiving vessel 14. The unvaporized liquid runs off the heated surface and is collected in receiving vessel 15.

Referring to Figure 2, the aldehyde-containing liquid mixture is preheated in preheater 20 and fed into a heated packed distillation column 21. The vaporized aldehydes are removed through overhead takeoff 22, condensed by condenser 23 and collected in receiving vessel 24. The unvaporized fraction is drained off through drain 25, located at the bottom of the packed distillation column.

In general, during flash distillation, the temperature of the liquid should be kept as low as possible, compatible with adequately rapid vaporisation. If too high a temperature is used, undesirable decomposition, polymerisation and condensation reactions, promoted by the metallic compounds, may occur. The temperature, during flash distillation may be kept low, for example, by employing a heat source which is only slightly higher in temperature than the safe operating temperature, or by contacting the liquid for a very brief period of time with a heat transfer surface, which may be at a temperature higher than that which the liquid could safely withstand in bulk. The rate at which heat is supplied to the liquid depends on the temperature of the heat supplied, the temperature of the liquid, the time for which it is supplied and the specific heat of the liquid. In flash distillation there is an upper limit to the temperature which can be used and this necessitates that the rate at which heat is supplied to the liquid does not result in the liquid being too long at temperatures at which substantial decomposition or undesirable chemical change can occur.

The flash distillation may be carried out in any convenient apparatus, which may comprise, for example, a surface heated to a suitable temperature and on to which the liquid mixture to be treated drips, whereby vapours of the desired aldehyde are produced, these vapours then being rapidly conducted away from the heated surface and condensed, to give the desired aldehyde. Alternatively, the liquid mixture to be treated may be fed at a suitable point into a packed column heated to a suitable temperature whereby a vapour containing predominantly the desired aldehyde is obtained. This vapour is removed from the distillation column and is cooled to give a liquid product containing the desired aldehyde, and which is substantially free from metal and those metallic compounds which catalyse condensation and/or polymerisation of the aldehyde.

In the production of aldehydes by reaction between an olefine, carbon monoxide and hydrogen in the presence of a suitable catalyst the reaction is usually carried out in the liquid phase at elevated pressure. With the higher olefines, for example with di-isobutene, their physical properties and the reaction conditions employed are sufficient to ensure that the reaction occurs in the liquid phase and a liquid product which contains unreacted olefine together with the desired aldehyde is obtained. When such a product is subjected to treatment according to the present invention the unreacted olefine is usually obtained as an overhead fraction together with the desired aldehyde, from which fraction the olefine and aldehyde are readily recovered. When the lower olefines, for example ethylene, propylene and butylene are used for the production of aldehydes by the above-mentioned process, it is usually necessary to provide an inert organic liquid vehicle so that the reaction can occur in the liquid phase. The liquid vehicle may be a solvent for the olefine being used and/or for the reaction products and may be such that it is vaporised with the aldehyde during the flash distillation process, for example it may be iso-octane, or it may be non-volatile during the distillation process, for example it may be an inert paraffinic hydrocarbon oil having a high boiling range or boiling point for example up to 200° C. or even higher. When a liquid vehicle is used with the lower olefines, any olefine remaining in the products of reaction is usually re-liberated when the reaction pressure is released so that little or no olefine remains in the reaction product submitted to flash distillation. Any olefine which may be present in this type of reaction product accompanies the aldehyde which is obtained as an overhead fraction by flash distillation.

The process of the invention may be operated at any suitable pressure according to the properties of the mixture being treated. In general it is desirable to operate under reduced pressure.

*Example 1*

In this example a crude nonaldehyde obtained by reacting di-isobutylene with carbon monoxide and hydrogen in the presence of a catalyst comprising metallic cobalt was used. This reaction product contained about 40% of nonaldehyde, 4% of non-steam volatile residues, 0.13% of cobalt, as cobalt compounds, together with unreacted olefine. This reaction product was passed through a preheater and fed at a temperature of 92° C. to a point about one third of the way down a mild steel column, 38" x 2" diameter, packed with stainless ¼" x ¼" steel gauze rings. This column was electrically heated both above and below this point so that the temperature at the top of the column was between 125° and 130° C. and at the bottom between 150° and 160° C. No boiler was attached to the column. The vapours passing from the top of the column were condensed but none of the condensate was returned to the column as reflux. The whole system was maintained under a pressure of about 150 mms. of mercury absolute. After operating this apparatus for 5 hours there had been obtained 7.4 litres of water-white product comprising nonaldehyde and olefine with less than 1% of material non-volatile in steam and containing less than ten parts of material per million of cobalt. 221 grams of a dark viscous oil had then been drawn from the bottom of the column and contained 3.8% of cobalt.

*Example 2*

A crude product made by reacting propylene with carbon monoxide and hydrogen in the presence of a catalyst consisting of metallic cobalt in a high-boiling inert paraffinic hydrocarbon oil (B. P. 170° to 200° C.) contained the equivalent of approximately 32% by weight butyraldehydes and 0.04% of cobalt, as cobalt compounds, with a minor amount of olefine. On feeding 220 litres of this to the apparatus described in Example 1 at a preheater temperature of 80° C. and column temperatures of almost 100° C. at the top, 150° C. at the bottom, 181 litres of distillate were obtained, containing the equivalent of 39% butyraldehydes and less than 10 parts per million of cobalt. The residual oil from the base of the column consisted of 39 litres containing 0.22% cobalt, as cobalt compounds.

While the process of the present invention has been described with particular reference to the crude product produced by reacting an olefine, carbon monoxide and hydrogen in the presence of a catalyst comprising metallic cobalt, it will be understood that the process of the present invention is also suitable for use with aldehyde-containing mixtures from other sources but which are similar in composition to those hereinbefore described, and which are contaminated with metals and/or metal compounds which tend to promote condensation and/or polymerisation of the aldehydes.

We claim:

1. A process for the treatment of a liquid mixture containing an aldehyde and at least one substance selected from the group consisting of cobalt and cobalt compounds which comprises the step of subjecting the liquid mixture to flash distillation and recovering the aldehyde as an overhead fraction.

2. A process as recited in claim 1 in which the flash distillation step is performed by supplying heat to the liquid at a high rate per unit volume of liquid.

3. A process as recited in claim 1 in which the flash distillation step is performed by feeding the liquid mixture to a heated, packed distillation column.

4. A process as recited in claim 1 in which the flash distillation step is performed by heating the liquid mixture while in the form of a thin film.

5. A process for separating an aldehyde from a reaction product produced by reacting an olefine selected from the group consisting of ethylene, propylene and the butylenes with carbon monoxide and hydrogen in the presence of an inert organic liquid and catalyst comprising metallic cobalt, which comprises subjecting the crude reaction product to a flash distillation and recovering the aldehyde as an overhead fraction.

6. A process as recited in claim 5 in which the aldehyde is a non-aldehyde and the olefine is diisobutylene.

7. A process as recited in claim 6 in which the flash distillation step is performed by heating the liquid mixture while in the form of a thin film.

ARTHUR WILLIAM CHARLES TAYLOR.
NORVIK ACKROYD.

REFERENCES CITED

The following references are of record in the file of this patent:

UNITED STATES PATENTS

| Number | Name | Date |
|---|---|---|
| 1,833,331 | Park | Nov. 24, 1931 |
| 2,336,493 | Marks | Dec. 14, 1943 |
| 2,453,423 | Emerson et al. | Nov. 9, 1948 |

OTHER REFERENCES

"Interrogation of Dr. Otto Roelen," B. I. O. S. Final Report 447, published July 18, 1947 by Office of Technical Services and Hobart Publishing Company, Box 4127, Chevy Chase Branch, Washington, D. C.